Jan. 2, 1962 E. C. HARTWIG ETAL 3,015,748
PYROTRON WITH TRANSLATIONAL CLOSURE FIELDS
Filed Feb. 13, 1958 3 Sheets-Sheet 1

INVENTORS.
EDWARD C. HARTWIG
DAVID B. CUMMINGS
RICHARD F. POST
BY
ATTORNEY.

INVENTORS.
EDWARD C. HARTWIG
DAVID B. CUMMINGS
RICHARD F. POST
BY
ATTORNEY

INVENTORS.
EDWARD C. HARTWIG
DAVID B. CUMMINGS
RICHARD F. POST
BY
ATTORNEY.

United States Patent Office 3,015,748
Patented Jan. 2, 1962

3,015,748
PYROTRON WITH TRANSLATIONAL CLOSURE FIELDS
Edward C. Hartwig, Walnut Creek, David B. Cummings, Livermore, and Richard F. Post, Walnut Creek, Calif., assignors to the United States of America as represented by the United States Atomic Energy Commission
Filed Feb. 13, 1958, Ser. No. 715,157
21 Claims. (Cl. 313—161)

The present invention relates generally to apparatus for raising ionized gas to high temperatures, and more particularly to apparatus for generating an axially symmetric magnetic field with translational terminal reflector field closures for confining plasma and increasing the energy thereof to high kinetic temperatures.

In various apparatus for raising gas to high temperatures, magnetic fields are employed to great advantage as non-material media or force fields for the containment of the gas in ionized form as a plasma, i.e., a tenuous system of highly-ionized nuclei and associated electrons, within an evacuated region. One class of apparatus having this utility is extensively considered in the copending application of Richard F. Post Serial No. 443,447, filed July 14, 1954. Presently, devices of the general character disclosed therein are "pyrotrons."

Basically a pyrotron in accordance with the above-referenced patent application is characterized by a manipulated axially symmetric magnetic field established within an evacuated region, such field having axially spaced, gradientially-intensified, nodal reflector field regions terminally bounding a less intense central field region to thereby establish a magnetic containment zone. Charged particles of whatever origin or method of introduction and with energies within the capabilities of the magnetic field are effectively retained within the containment zone for relatively long periods as a plasma, e.g., of ionized heavy hydrogen isotopes. Furthermore, as provided in various embodiments of the pyrotron, the plasma is heated to extremely high kinetic temperature and is densified by adiabatic compression processes obtained by appropriate manipulation of the magnetic field as disclosed in said copending application.

Among the more important manipulations employed in pyrotron operation are those relating to the increase of the overall magnetic field intensity while favoring a sharper increase in the reflector field regions and to the translational movement of such reflector field regions along the longitudinal axis. Proximal movement of the reflector regions and overall increase of magnetic field intensity of the containment zone produce both radial and axial compression of the plasma with an attendant adiabatic heating of the plasma particles to very high kinetic temperatures and the collection of the reactant ions into a severely limited region.

In accordance with a preferred method of plasma confinement and heating disclosed in the aforementioned patent application, the requisite magnetic containment field is preferably generated in general by means of a segmented series of windings in combination with appropriate programming circuitry to switch electrical energy from a power source to pairs of corresponding segments in inward sequence. In addition such circuitry may provide for the subsequent deenergization of corresponding pairs of segments in outward succession. Accordingly, a magnetic containment field is established having the configuration and character hereinbefore described wherein the overall field intensity increases with an attendant axially inward translatory movement of the reflector field closures, and then may be made to decrease and/or the reflector field closures translated axially outward.

The present invention provides a pyrotron with translational reflector field closures of the character described above, including preferred programming circuitry and associated means for establishing same. More particularly, the present invention comprises a pyrotron constructed generally in accordance with the aforesaid patent application and having an elongated segmented containment field solenoid. The programming circuitry is arranged to sequentially energize pairs of the solenoidal segments in inward succession while synchronously energizing the remaining series array of segments disposed between the two energized terminal end segments with time rising current. A time rising containment field is thereby produced having inward translatory reflector field closures for accomplishing radial and axial adiabatic compression processes upon a plasma confined therein resulting in heating of same to highly elevated temperatures. The containment field may then be maintained or permitted to decrease in intensity to facilitate adiabatic decompression processes.

Accordingly, it is an object of the present invention to provide a pyrotron capable of the adiabatic compression and/or decompression of an ionized gas or plasma.

Another object of the invention is the provision of translatory reflector field closures in a pyrotron.

It is still another object of the present invention to provide a pyrotron including electronic means for producing a moving magnetic field wherein energy is efficiently transferred in the direction of field motion.

One other object of the invention is the provision of a magnetic field booster for extending the decay time of a pyrotron magnetic containment field beyond the decay time determined by normal loss mechanisms in the field winding.

The invention, both as to its organization and method of operation, together with further objects and advantages thereof, will be better understood by reference to the following specification taken in conjunction with the accompanying drawing, of which:

Figure 1:
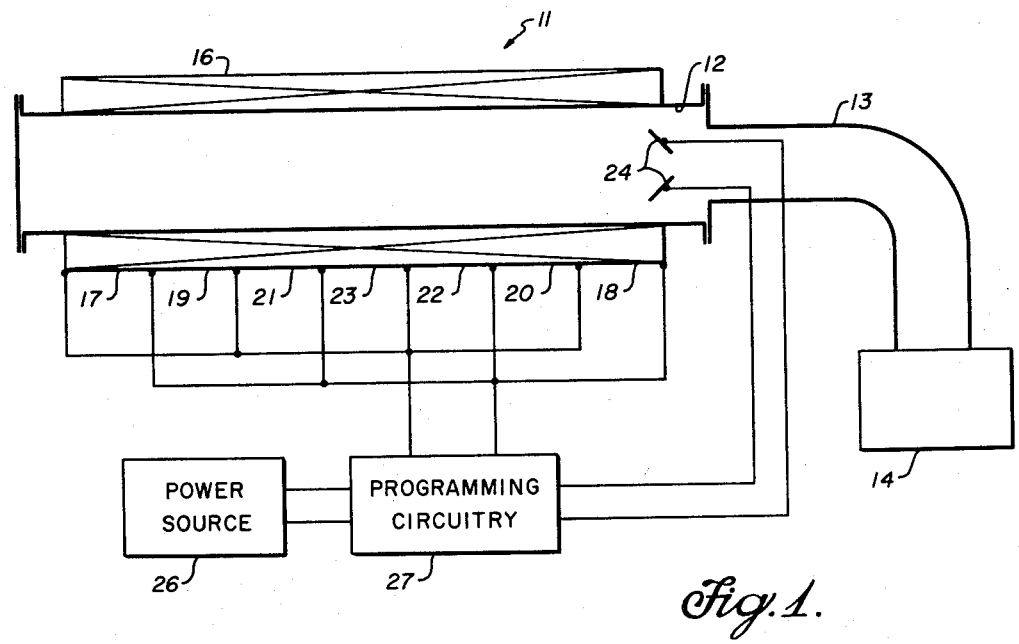
FIGURE 1 is a semi-diagrammatic illustration of a basic embodiment of the pyrotron of the present invention.

Considering now the invention in some detail and referring to the forms thereof illustrated in the drawing, there is provided a pyrotron 11 of generally conventional construction including means establishing an evacuated zone which is preferably provided as a vacuum chamber 12, pervious to magnetic fields. The vacuum chamber is best constructed as an elongated closed cylinder and is coupled as by means of a conduit 13 to vacuum pump and cold trap means 14 of conventional design and arranged to provide recovery and recycling of gaseous materials exhausted from such chamber 12.

Means are provided for establishing an axially symmetric magnetic containment field having translational terminal reflector field closures within the evacuated chamber 12 and such means in accordance with the salient aspects of the present invention preferably includes an elongated segmented solenoidal coil winding 16 disposed concentrically about chamber 12 so as to enclose a substantial length thereof. Solenoid 16 may include any number of solenoidal segments as desired, depending on the intended purposes of the particular pyrotron. In the interests of simplicity and clarity, however, the solenoid 16 is herein depicted as having seven segments 17 through 23 inclusive of equal axial length and inductance and accordingly no inferences are to be drawn therefrom nor is same intended to be limited upon the spirit and scope of the invention. Solenoid 16 may be uniformly distributed and may be disposed either within or without chamber 12, optionally, as desired. Moreover, such solenoid need not be fabricated as a single continuous winding including segmented tapping points to facilitate coupling to said segments but may in addition comprise a plurality of individual solenoidal segments arranged in coaxial juxtaposition about chamber 12 and connected in electrical series.

Within the chamber 12 are disposed appropriate ion sources 24 which may be disposed centrally or in radial banks in one or both terminal regions of the chamber 12, outwardly of about the terminal planes of solenoid 16, to effect injection of space charge neutralized ions within the chamber in accordance with established pyrotron practice. Such ion sources 24 may be operated intermittently or continuously under various circumstances which will become apparent from the ensuing description.

Energization of the components of the above-described pyrotron is accomplished by means of a suitable power source 26 coupled through programming circuitry 27 to solenoidal segments 17 through 23 inclusive and to ion sources 24. Such circuitry is arranged to energize the ion sources correlatively with the switching of electrical power, as from source 26, to pairs of corresponding segments, i.e., 17 and 18, 19 and 20, 21 and 22, in concert with application of power to the remaining ones of said segments as interposed between the inwardly energized pairs. A magnetic containment field having spaced gradientially-intensified terminal reflector field closures is thus established longitudinally of evacuated chamber 12 correlatively with the injection of ions thereinto, and the intensity of such containment field is rising in time simultaneously as said field closures move proximally to thereby trap and heat a charge of the injected plasma to extremely high temperature by adiabatic processes including radial and axial compression of the plasma. Programming circuitry 27 may then be employed to sustain the compression and in turn sustain the reaction rate with additional plasma injection as required or to effect decompression by effecting a decrease in the overall containment field intensity with respect to time by normal loss mechanisms in the windings of solenoid 16.

Figure 2:
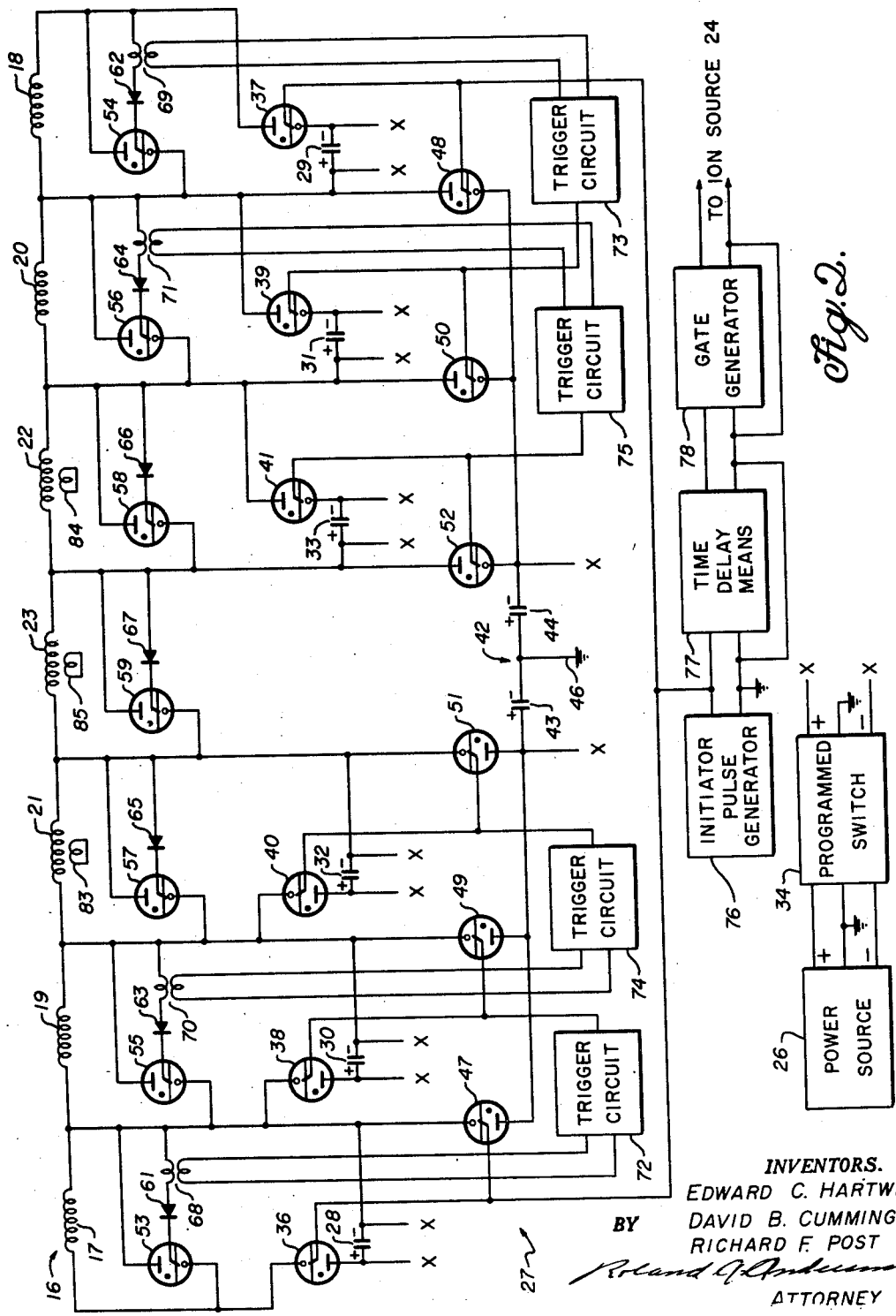
FIGURE 2 is a schematic circuit diagram of a preferred embodiment of the programming circuitry employed in the embodiment of FIGURE 1.
Figure 4:
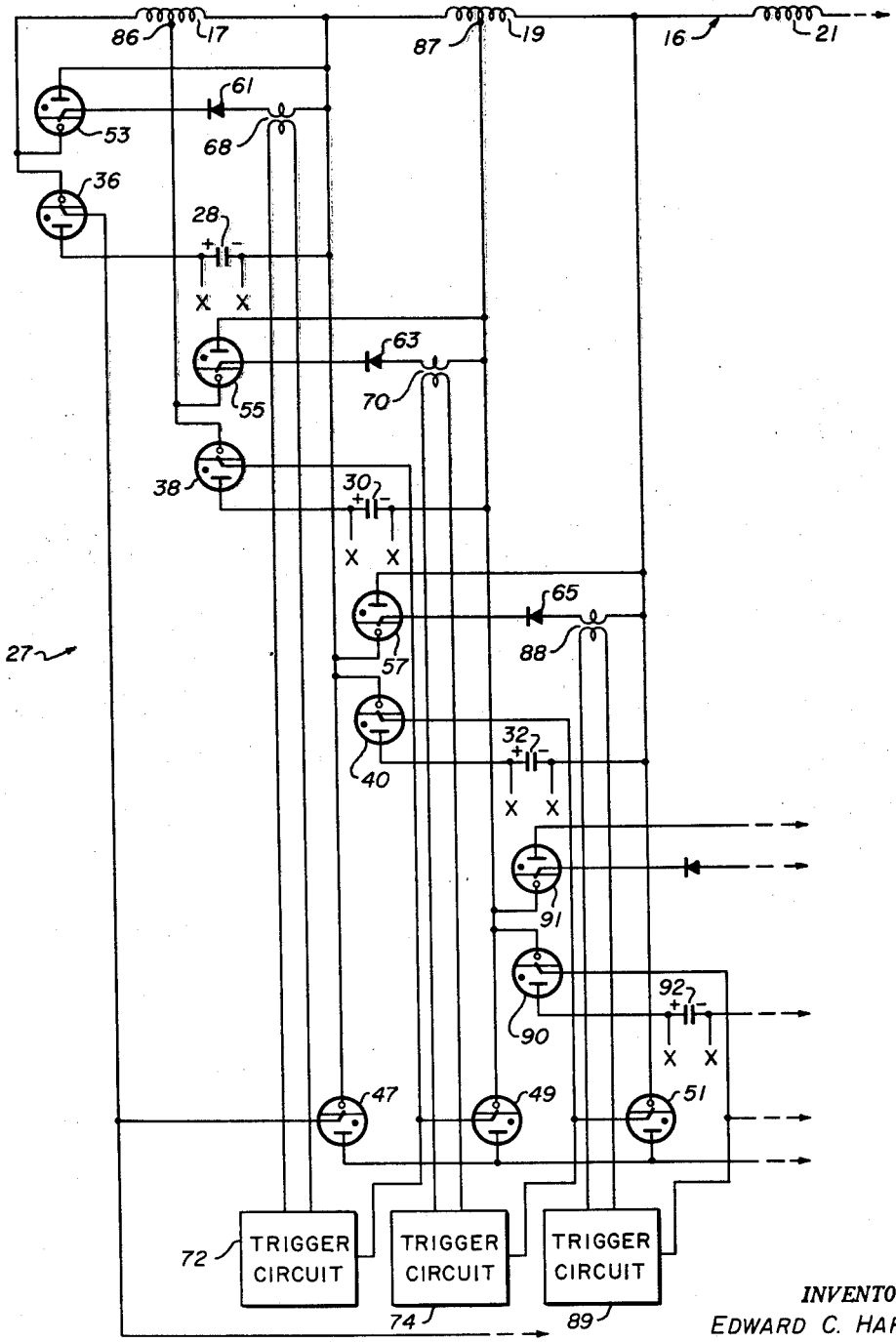
FIGURE 4 is a schematic circuit diagram illustrating modifications to the circuit of FIGURE 2 for optimizing the mutual inductive coupling between successively adjacent segments of the embodiment of FIGURE 1.

Considering now the programming circuity 27 in some detail with respect to several embodiments thereof as illustrated in FIGS. 2 and 4 of the drawing, it is to be noted that such circuitry generally comprises a plurality of electrical energy storage means, e.g., large capacitors or banks of capacitors, which are energized by power source 26 and are correspondingly coupled through series switching means to the individual segments of solenoid 16. A central electrical energy storage means energized by power source 26 is additionally respectively coupled through a parallel array of switching means to the solenoid segments disposed centrally of the two extreme end segments of the solenoid whereby various ones of the central segments in series may be selectively connected across the central storage means. A plurality of short circuit switching means are further provided correspondingly in shunt with the individual segments of solenoid 17. All of the foregoing switching means as well as ion sources 24 are responsively connected to programming means which are arranged to correlatively energize the ion sources and actuate pairs of the series, parallel, and short circuit switching means respectively substantially in concert and sequentially inward from both ends as the currents through each succeeding pair of energized segments reach maximum values.

More particularly, as illustrated in FIG. 2, one embodiment of the programming circuitry 27 of the pyrotron of the instant invention includes a plurality of electrical energy storage means which preferably comprise capacitor banks 28 through 33 respectively (depicted as single capacitors in the figure). The capacitor banks are connected in parallel with electrical energy source 26 through a suitable programmed switch 34, as for example, a plurality of ignitrons in parallel, for alternately charging the banks to full voltage and disconnecting the charging source 26 therefrom in a conventional manner.

Capacitor banks 28 through 33 are correspondingly connected in series with segments 17 through 22 of solenoid 16 through high current switching means such as ignitrons 36 through 41 respectively, or equivalent means. Ignitrons 36, 38, 40 connected to solenoid segments 17, 19, 21 respectively disposed on one side of the center segment 23, are each employed with their cathode pools connected to corresponding terminals of the segments and anodes connected to the positively charged sides of capacitors banks 28, 30, 32, respectively, the negative sides of which are connected to the other corresponding terminals of the solenoidal segments. Conversely, the anodes of ignitrons 37, 39, 41 are respectively connected to corresponding terminals of segments 18, 20, 22 on the other side of center segment 23, and their cathode pools are in electrical attachment with the negatively charged sides of capacitor banks 29, 31, 33, the positively charged sides of which are connected to the other corresponding terminals of the solenoidal segments to form individual series circuits therewith. It is to be noted that the foregoing connections to the terminals of each one of the solenoidal segments are made consistent with the polarity of charge upon the corresponding capacitor banks to establish current flow through all segments in the same axial direction.

In addition to the plurality of electrical energy storage means, e.g., capacitor banks 28 to 33, inclusive, associated with individual ones of the segments of solenoid 16, there is provided a central electrical energy storage means, e.g., a large capacitor bank 42, for energizing various series combination of the solenoidal segments. Capacitor bank 42 is best facilitated by at least two subbanks 43, 44 connected in series, i.e., with the positively charged plates of one connected to the negatively charged plates of the other, and connected to ground at their common junction as shown generally at 46. Charging of the bank 42 is best facilitated by connecting same to power source 26 through programmed switch 34.

Capacitor bank 42 is commonly coupled to solenoidal segments 19 to 23, inclusive, disposed centrally of end segments 17, 18 as by a corresponding parallel array of switching means, for example ignitrons 47 to 52 inclusive. The cathode pools of ignitrons 47, 49, 51 are respectively connected to the outward terminals of segments 19, 21 and to the corresponding outward terminal of center segment 23 whereas their anodes are commonly connected to the positively charged side of capacitor bank 42. Conversely, ignitrons 48, 50, 52 are arranged with their anodes respectively connected to the outward terminals of segments 20, 22 and corresponding outward terminal of center segment 23 and their cathode pools connected in common with the negatively charged side of capacitor bank 42.

Short circuit switching means are connected in shunt with each one of the segments of solenoid 16 and such means are preferably ignitrons 53 to 59, inclusive, having their cathode pools and anodes correspondingly connected to the terminals of segments 17 to 23 inclusive rendered positive and negative respectively by charged capacitor banks 28 to 33, inclusive.

In order that the various switching means of previous mention be appropriately actuated commensurate with the establishment of a magnetic containment field in accordance with the present invention, the programming means of previous mention may include, for example, means responsive to the attainment of peak current in each segment of solenoid 16 for actuating the corresponding short circuit switching means and the series and parallel switching means of successive inwardly adjacent segments. More particularly, suitable peak current detectors are respectively coupled to solenoidal segments 17 to 23, inclusive, and such detectors are preferably diodes 61 to 67, inclusive, having their cathodes connected to the igniters and their anodes coupled to the anodes of the corresponding ones of short circuit ignitrons 53 to 59, inclusive. As peak current is attained in each segment, the corresponding diode is rendered conducting to thereby trigger the associated short circuit ignitron and thus short circuit the segment. Diodes 61, 62, 63, 64 are further, respectively, coupled to trigger means which may include pulse transformers 68, 69, 70, 71 having their primary windings connected in series with such diodes, or other suitable means for generating pulses in response to initiation of conduction therein. The secondary winding of transformer 68 is commonly coupled to the igniters of the corresponding inwardly successive series ignitron 38 and parallel ignitron 49, as by means of a trigger circuit 72 for generating a high energy output pulse in response to each pulse generated at the transformer, while the secondary winding of transformer 69 is similarly commonly coupled to the igniters of series ignitron 39 and parallel ignitron 50 as by means of trigger circuit 73. The secondary windings of transformers 70 and 71 are in the same manner respectively commonly connected to the igniters of inwardly successive ignitrons 40, 51 and ignitrons 41, 52 through trigger circuits 74, 75, respectively.

Programming circuitry 27 also includes an initiator pulse generator 76 to commence operation of the pyrotron 11. Upon actuation, generator 76 produces pulses at a predetermined repetition rate commensurate with the desired operating cycle of the reactor, i.e., generator 76 functions as the rate generator for the pyrotron. The output of the initiator generator is consequently coupled directly to the igniters of the extreme outward pairs of series and parallel ignitrons 36, 37 and 47, 48, respectively, to initiate establishment of the magnetic containment field within vacuum chamber 12. Such generator 76 is also connected through suitable time delay means 77, e.g., a time delay line, to the input of a gate generator 78, or equivalent means, the output of which is connected in gating relationship to the ion sources 24.

Accordingly, in operation, the vacuum chamber 12 is first exhausted to a suitably low pressure of the order of $10^{-5}$ to $10^{-6}$ mm. of mercury by pumping means 14 and capacitor banks 28 through 33, inclusive, and 42 are precharged to full voltage by power source 26 through programmed switch 34. The anodes of series ignitrons 36 to 41, inclusive, with respect to the cathodes thereof are thus maintained at the positive potential of each corresponding one of the banks 28 to 33, inclusive, while the anodes of parallel ignitrons 47 to 52, inclusive, are rendered positive with respect to the cathodes thereof by the potential of bank 42.

A pulse appearing at the output of initiator generator 76 is directly applied to the igniters of series ignitrons 36, 37 and parallel ignitrons 47, 48, respectively, to thereby render same conducting. Capacitor banks 28, 29 are thus respectively placed in series with end segments 17, 18 of solenoid 16 and capacitor bank 42 is simultaneously placed in series with solenoid segments 19 to 23, inclusive. It is to be noted that the foregoing charged capacitor banks and their associated solenoidal segments respectively comprise oscillatory circuits, and therefore capacitor banks 28, 29 discharge sinusoidally through segments 17, 18, respectively, and capacitor bank 42 similarly discharges through segments 19 to 23 inclusive in series. The periods of the sinusoidal current oscillations through segments 17 and 18 are respectively directly proportional to the square root of the inductance thereof and the capacitance of banks 28 and 29, respectively. As previously mentioned, the inductances of each one of the solenoidal segments 17 to 23, inclusive, are equal and the capacitances of banks 28 to 33, inclusive, are made equal whereby the current through each end segment 17, 18 reaches a maximum value substantially simultaneously after a quarter cycle of sinusoidal current oscillation, i.e., after a time equal to one fourth of the period of said oscillation.

The period of sinusoidal current variation through segments 19 to 23, inclusive in series is similarly determined by the total inductance of such segments and the capacitance of capacitor bank 42 which capacitance is chosen such that the period is very long compared to the period of the current oscillations in segments 17 and 18. The currents through such end segments 17, 18 therefore reach maximum values after a time equal to a small fraction of a quarter cycle of the current through the central segments 19 to 23, inclusive. The instantaneous magnitude of current in the end segments is thus comparatively large with reference to the magnitude of the current through the central segments whereby the corresponding magnetic containment field intensity profile axially of vacuum chamber 12, corresponding to maximum current in end segments 17, 18, is as depicted by profile curve 79 of FIG. 3. As shown therein, an axially symmetric magnetic containment field is established with a central field region of intensity, $H_0$, in the general proximity of central solenoidal segments 19 to 23 and bounded terminally by gradientially intensified or nodal reflector field closure regions of intensity $H_1$, generally proximate segments 17 and 18 and defining a magnetic containment zone along the central axial portion of the segmented solenoid. The relative magnitudes of $H_1$ and $H_0$ are determined by the relative values of various constants of the circuit, viz., capacitance of capacitor banks 28, 29, 42, inductance and resistance of each of the segments of solenoid 16, maximum bank voltages, and the like, whereby considerable latitude in the selection of magnetic containment field characteristics is obtainable by varying the design characteristics of programming circuit 27.

Correlatively with the attainment of maximum current through solenoidal segments 17, 18, the sinusoidal voltage oscillation across such segments is made to pass through zero and reverse in polarity by suitable selection of the values of the circuit components in the inductive-capacitive circuit such that the voltage variation leads the current variation by 90 electrical degrees. Consequently, the voltage at the anodes of diodes 61, 62 and the anodes of short circuit ignitrons 53, 54 becomes positive with respect to the voltage at their respective cathodes to thereby render such diodes conducting and trigger the corresponding ignitrons. Simultaneously conduction through series ignitrons 36, 37 and parallel ignitrons 47, 48 is terminated due to the voltage reversal. Segments 17, 18 are thus short circuited through ignitrons 53, 54 substantially at the instant maximum current is flowing in the segments. The current through short circuited segments 17, 18 then rapidly decays exponentially with time, a substantial portion of the energy stored in the segments being respectively transferred to inwardly adjacent segments 19, 20 by mutual inductive coupling.

Simultaneously with the establishment of conduction in diodes 61, 62, the resulting flow of current through the primary windings of pulse transformers 68, 69 respectively produces corresponding pulses at the secondary windings thereof, which pulses are applied to trigger circuits 72, 73, respectively. In response to such pulses, the trigger circuits simultaneously trigger series ignitrons 38, 39 and parallel ignitrons 49, 50 to thereby discharge capacitor banks 30, 31 through solenoidal segments 19, 20, respectively, and connect central capacitor bank 42 in series with solenoidal segments 21, 22, 23.

The resulting currents flowing through segments 19, 21 respectively are essentially equal to the portions of the currents inwardly coupled thereto from segments 17, 18, increased by the rapidly increasing sinusoidal currents as result from the discharging capacitor banks 30, 31. The current through the central segments 21, 22, 23 similarly increases, but relatively slowly, from the magnitude attained therein prior to the switching of ignitrons, 49, 50 as capacitor bank 42 continues to discharge. The overall intensity of the magnetic containment field established by the foregoing currents in solenoidal segments 19 to 23 is thus increasing with time until maximum current is attained in segments 19, 20 and the axial intensity profile is essentially as depicted by curve 81 of FIGURE 3 wherein a central field region of intensity $H_0'$ is terminally bounded by reflector field regions of intensity $H_2$. The intensities $H_0'$ and $H_2$ are respectively of greater intensity than $H_0$ and $H_1$, and the axial separation of the reflector field regions $H_2$ is substantially less than the separation of regions $H_1$.

The establishment of maximum current in solenoidal segments 19, 20 causes diodes 63, 64 to conduct due to the corresponding voltage reversals across such segments and a pulse to be applied to trigger circuits 74, 75, from pulse transformers 70, 71, respectively. Ignitrons 55, 56 are thus rendered conducting to thereby short circuit the segments 19, 20 and, simultaneously, series and parallel ignitrons 40, 41 and 51, 52 respectively conduct in response to output pulses from trigger circuits 74, 75.

Charged capacitor banks 32, 33 consequently discharge sinusoidally through solenoidal segments 21, 22 and energy is inductively coupled thereto from short circuited segments 19, 20 in the manner hereinbefore described. At the same time the partially discharged capacitor bank 42 sinusoidally energizes segment 23. The constants of the circuit, e.g., capacitance of banks 28 to 33 and 42, inductance and number of the segments forming solenoid 16, and the like, are advantageously selected such that capacitor bank 42 is fully discharged simultaneously with discharge of banks 32, 33. The currents flowing through solenoidal segments 21, 22, 23, respectively, accordingly attain maximum values at substantially the same time while the voltages thereacross simultaneously reverse in polarity. Diodes 65, 66, 67 then conduct to correspondingly actuate ignitrons 57, 58, 59 and thereby short circuit solenoidal segments 21, 22, 23 in concert. The magnetic field intensity profile established under the foregoing conditions is as depicted by curve 82 of FIGURE 3 wherein the intensity profile includes terminal reflector field regions of intensities, $H_3$, bounding a less intense central field region of intensity $H_0''$. The foregoing intensities are respectively greater than the intensities $H_2$ and $H_0'$ of curve 81 and reflector field regions $H_3$ in general correspond spatially to solenoidal segments 21, 22 whereby the axial separation of same is considerably less than the spacing of reflector field regions $H_2$.

It is therefore readily ascertainable that the intensity of the magnetic containment field established longitudinally of vacuum chamber 12 of the pyrotron 11 herein described is increasing with time while the reflector field closures of such field are translated proximally to assume the final intensity profile of curve 82. It will be appreciated, however, that in the absence of auxiliary apparatus such as field boosters, additional programming circuitry and the like, as will be described hereinafter, the final containment field intensity of curve 82 decays exponentially with time due to attendant resistive power losses in the windings of solenoid 16

It is to be noted that the pulse from initiator generator 76 which commences generation of the magnetic containment field as previously described also triggers gate generator 78 after a short time delay effected by time delay means 77 to insure prior establishment of the field. Generator 78 responsively gates ion sources 24 which inject nuclear particles into the containment field or zone established within vacuum chamber 12, particle injection being continued for a time determined by the duration of the gate pulse produced by gate generator 78. The pulse duration may be accordingly adjusted to facilitate nuclear particle injection in the form of a plasma over any desired portion of the containment field rise time. The injected plasma is effectively "trapped" within the magnetic containment zone disposed between the reflector field closures and is radially and axially compressed as the field is intensified with time and the terminal reflector field closures are translated proximally along the axis. Therefore, as the magnetic containment field approaches the final configuration depicted by the axial intensity profile curve 82 of FIGURE 3, the contained plasma is correspondingly transformed from a tenuous state into a more dense state with attendant increase in the kinetic energy or temperature of the contained particles. The state of ultimate compression may then be sustained by various field booster means hereinafter described to maintain the plasma at elevated temperature.

Radial and correlative axial decompression of the magnetic containment field may be effected under appropriate control and direction of programming circuitry (not shown) similar in construction and operation to programming circuitry 27 hereinbefore described but whereby the reflector field regions are moved outwardly and the energy resident in the magnetic field and/or in the energetic plasma particles is dissipated, stored for subsequent use and/or delivered externally. Inasmuch as decompression of the containment field is the exact reversed operation of compression, it will be apparent that a back-to-back arrangement of the components of programming circuitry 27 is implicit in the construction of appropriate decompression programming circuitry.

Figure 3:
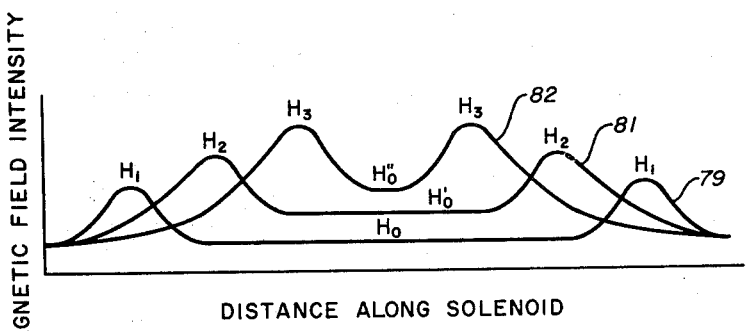
FIGURE 3 is a graphical illustration of a corresponding magnetic field intensity profile along the axis of the embodiment of FIGURE 1 as effected by the programming circuitry of FIGURE 2.

Considering now various field booster means which may be employed to maintain the containment field in the final configuration of ultimate compression depicted by curve 82 of FIGURE 3 for various purposes including those mentioned above, it is to be noted that such configuration may be maintained by replenishing the attendant resistive power losses to the solenoidal segments 21, 22, 23. The field booster means may thus include various conventional electrical energy sources, i.e., charged capacitor banks, batteries, generators, and the like, connected in series with short circuit ignitrons 57, 58, 59 and adapted to supply the resistive power losses to the segments whereby the magnetic field is maintained constant. One other less obvious field booster as illustrated in FIGURE 2 utilizes to great advantage the principles of magnetically coupled circuits. As shown in the figure, single turn or short circuited coils 83, 84, 85 are respectively inductively coupled to the central three solenoidal segments 21, 22, 23 as by disposing the coils about vacuum chamber 11 concentric with the corresponding segments. Coils 83, 84, 85 are designed to have time constants appreciably less than those of segments 21, 22, 23. Accordingly, the time rising currents are induced in the single turn coils in response to the decay of the magnetic containment field due to losses in the solenoidal segments. The induced currents in the coils produce magnetic fields which in turn induce currents in the solenoidal segments, such currents being a direction to retard the decay of the containment field. Consequently, the single turn coils 83, 84, 85 comprise booster means which are effective in maintaining the containment field in its configuration of ultimate compression for relatively long periods of time.

As regards optimization of the efficiency with which energy is inductively transferred inwardly from segment to segment of solenoid 16 as such segments are short circuited in inward succession, it is to be noted that the mutual coupling, and therefore the energy transfer efficiency between successive segments of the solenoid is appreciably increased by overlapping adjacent segments. The foregoing may be accomplished by disposing the solenoidal segments in physical overlapping relationship or, more preferably, by effecting an equivalent electrical overlap as illustrated in FIGURE 4. The individual segments of solenoid 16 are tapped at predetermined positions intermediate the ends of each segment for effecting the desired amount of overlap and the taps are connected to programming circuitry 27 in such a manner that portions of each segment are electrically common with virtual adjacent segments as disposed between the taps. In order to effect a ½ overlap, the solenoidal segments are each tapped at their mid-length points, e.g., center taps 86, 87 are provided as shown in the figure in the interests of simplicity and clarity for segments 17, 19, respectively. The series, parallel, and short circuit ignitrons 36, 47, 53, respectively, and their directly associated components including capacitor bank 28 are connected to segment 17 in identical fashion to that hereinbefore described in regard to the embodiment of FIGURE 2. The next succeeding series ignitron 38, however, is connected for the purposes of the present embodiment, to tap 86, while parallel ignitron 49 is connected to tap 87 and short circuit ignitron 55 between taps 86 and 87. Capacitor bank 30 is consequently discharged through the portion of solenoid 16 disposed between taps 86, 87, comprising adjacent halves of segments 17, 19. Such portion of the solenoid is thus in effect a virtual segment inwardly adjacent segment 17 and overlapping same by a factor of one-half.

Similarly, series ignitron 40 is connected to the juncture of segments 17 and 19 and parallel ignitron 51 to the juncture of segments 19 and 21 while the corresponding short circuit ignitron 57 is paralleled with segment 19. Capacitor bank 32 is thus adapted for responsive discharge through segment 19, such segment being now the third inwardly successive segment and overlapping the virtual segment as disposed between taps 86 and 87 by a factor of one-half. The remaining segments of solenoid 16 may be similarly arranged as described above in conjunction with additional circuit components, e.g., pulse transformer 88, trigger circuit 89, series ignitron 90, short circuit ignitron 91, capacitor bank 92, and the like, to effect electrical overlap of adjacent segments and thereby provide increased inductive coupling therebetween. It is to be appreciated that inasmuch as the mutual inductance between adjacent segments increases in proportion to the amount of overlap, the amount of electrical energy transferred in a given period of time between the overlapped segments of solenoid 16, may be increased to the extent that all of the energy, irrespective of resistive power losses, is transferred within the time required for the current in the inward one of the overlapped segments to rise to maximum value. Moreover, the amount of overlap correspondingly reduces the size of the capacitor banks required to effect transfer of all of the energy between the overlapped segments.

Although the various embodiments of the present invention hereinbefore described are in general considered with respect to a particular pyrotron configuration having a magnetic containment field wherein the terminal reflector field closures are moved proximally in axial opposition, it will be appretciated that the salient aspects of the invention may be additionally applied to other configurations for diverse manifold purposes. For example, a time rising magnetic field having one moving reflector field closure, as produced by a portion of solenoid 16 such as segments 17, 19, 21, 23 and the associated components of programming circuitry 27, may be advantageously employed as a plasma acceleration means. Such a moving magnetic reflector field when established in a region containing a plasma is effective in urging a substantial portion of the plasma axially ahead of same and therefore is useful for moving plasma from one location to another, as from a reaction or preheater zone to an accumulator or second reaction zone of a linear multiple zone reactor of the general character described in the aforesaid basic pyrotron application.

While the invention has been disclosed with respect to but several preferred embodiments, it will be apparent to those skilled in the art that numerous further variations and modifications may be made within the spirit and scope of the invention and thus it is not intended to limit the invention except as defined in the following claims.

What we claim is:

1. Means for producing a magnetic field for containing plasma and raising same to elevated temperatures comprising an elongated solenoid formed of a plurality of solenoidal segments connected in series, a plurality of electrical energy storage means corresponding to the solenoidal segments on each side of the center one thereof, central electrical energy storage means, a power source connected in charging relationship with said plurality of storage means and said central storage means, a plurality of series switching means correspondingly connected between said plurality of storage means and the solenoidal segments disposed on each side of the center one thereof, a parallel array of switching means connected between the central storage means and the solenoidal segments disposed centrally of the two extreme end segments thereof, a plurality of short circuit switching means correspondingly coupled in shunt with the plurality of solenoidal segments, and programming means responsively coupled to said switching means for correlatively actuating pairs of the series, parallel, and short circuit switching means in inward sequence from both ends of said solenoid as the currents through each succeeding pair of energized segments attain maximum values.

2. The means defined by claim 1 wherein said plurality of electrical energy storage means and said central electrical energy storage means are capacitor banks.

3. The means defined by claim 1 wherein said switching means each comprise at least one ignitron.

4. A pyrotron comprising an elongated vacuum chamber pervious to magnetic fields, vacuum pump and cold trap means for evacuating said chamber, an elongated segmented solenoid disposed concentric with reference to said vacuum chamber, a plurality of capacitor banks each corresponding to a different one of the solenoidal segments disposed outwardly from the center one thereof, a plurality of ignitrons respectively connected in series with said capacitor banks and corresponding solenoidal segments, a central capacitor bank, a parallel array of ignitrons each connected to a different one of the solenoidal segments disposed inwardly from the end segments of said solenoid and commonly connected to said central capacitor bank, a plurality of short circuit ignitrons correspondingly connected in shunt with the segments of said solenoid, a power source coupled in charging relationship to said capacitor banks, programming means coupled to the igniters of said ignitrons for correlatively triggering respective pairs of the series, short circuit, and parallel array of ignitrons in inward sequence from both ends of said solenoid as peak current is attained in each successively energized pair of segments to thereby establish in said vacuum chamber an axially symmetric magnetic field increasing in intensity and having spaced gradientially-intensified reflector field closures defining a containment zone, said closures moving proximally along the axis of the chamber, and ion source means responsively coupled to said programming means for directing ions and space charge neutralizing electrons into said containment zone correlatively with the translation of said reflector field closures.

5. A pyrotron as defined in claim 4 wherein said programming means includes means responsive to the attainment of peak current in each segment of said solenoid and connected to the igniter of the corresponding short circuit ignitron to render same conducting and pulse generating means correspondingly coupled to said last named means and commonly connected in triggering relationship to the igniters of the series ignitron and parallel ignitron respectively connected to correspondingly inward successive segments.

6. In a pyrotron, means for generating a magnetic containment field comprising a plurality of solenoidal segments connected in series, a plurality of electrical energy storage means, a plurality of series switching means correspondingly connecting said storage means to the solenoidal segments disposed outwardly from the center one thereof, central electrical energy storage means, a parallel array of switching means each connected to a different one of the solenoidal segments disposed inwardly from the extreme end segments, the switching means connected to the segments on one side of the center segment being commonly connected to one side of said central storage means and the switching means connected to segments on the other side of the center segment being commonly connected to the other side of said central storage means, a power source coupled in charging relationship to said plurality of storage means and said central storage means, a plurality of short circuit switching means correspondingly connected in shunt with said solenoidal segments, initiator means coupled to the extreme outward pairs of series and parallel switching means for actuating same in concert, means responsive to the attainment of peak current in each one of said segments for correspondingly actuating said short circuit switching means, and a plurality of trigger means respectively responsively coupled in actuating relationship between each one of said last named means corresponding to segments disposed outwardly from the central three segments and each corresponding inwardly successive pair of series and parallel switching means to thereby establish an axially symmetric magnetic field increasing in intensity and having spaced gradientially-intensified reflector field closures moving proximally along the axis of said field to positions of extreme central displacement in the region of said central three solenoidal segments, the intensity of the field then decreasing with time.

7. The device defined by claim 6 further defined by field booster means coupled to said central three solenoidal segments to extend the time required for the magnetic field to decrease in intensity.

8. The device defined by claim 7 further defined by said field booster means comprising single turn coils inductively coupled to said central three solenoidal segments.

9. Means for producing a magnetic field for containing and compressing an ionized nuclear gas to materially increase the temperature thereof comprising an elongated segmented solenoid, a plurality of capacitor banks, a plurality of series electronic switching means correspondingly connecting said banks to the solenoidal segments disposed outwardly from the center one thereof, a central capacitor bank, an array of parallel electronic switching means each connected to a different one of the segments of said solenoid disposed inwardly from the extreme end segments thereof, the switching means connected to segments on one side of said center segment being commonly connected to one side of said central capacitor bank and the switching means connected to segments on the other side of the center segment being commonly connected to the other side of said central capacitor bank, a power source for precharging said plurality of capacitor banks and said central capacitor bank, a plurality of short circuit electronic switching means correspondingly connected in shunt with said segments, initiator means coupled to the extreme outward pairs of series and parallel switching means for triggering same in concert, peak current detectors coupled between said segments and corresponding short circuit switching means for triggering same in response to peak current in each associated segment, and a plurality of trigger means respectively responsively coupled in triggering relationship between each one of said detectors corrseponding to segments disposed outwardly from the central three segments and each of the corresponding inwardly successive pairs of series and parallel switching means.

10. Means defined by claim 9 wherein said series, parallel, and short circuit electronic switching means respectively each comprise at least one ignitron.

11. Means as defined by claim 9 wherein said peak current detectors are diodes.

12. Means as defined by claim 9 wherein said trigger means each includes a pulse transformer coupled to said peak current detectors.

13. Means for producing a magnetic field for containing and compressing an ionized nuclear gas to materially increase the temperature thereof as defined by claim 9 wherein adjacent segments of said solenoid are overlapped to optimize mutual inductive coupling therebetween.

14. Means for producing a magnetic field for containing and compressing an ionized nuclear gas to materially increase the temperature thereof as defined by claim 9 wherein adjacent segments of said solenoid are electrically common and thereby effectively overlapped electrically.

15. Means for producing a magnetic field for producing high kinetic energies in an ionized gas comprising an elongated solenoid formed of a plurality of solenoidal segments connected in series, said segments respectively including taps intermediate the ends thereof, a plurality of electrical energy storage means, central electrical energy storage means, a power source coupled in charging relationship with said plurality of storage means and said central storage means, a p urality of series switching means correspondingly coupling said plurality of storage means in closed series relationship with the ends of said segments and taps of adjacent pairs of said segments respectively in alternate order, a parallel array of switching means each connected to a different one of the taps and junctures between adjacent segments respectively and commonly connected to corresponding sides of said central storage means with respect to the center of said solenoid, a plurality of short circuit switching means correspondingly alternately connected between the ends of said segments and between the taps of adjacent pairs of said segments, and programming means responsively coupled to said switching me ans for correlatively actuating pairs of the series, parallel, and short circuit switching means in inward sequence from both ends of said segment simultaneously with the attainment of maximum current through each successive pair of segments and portions of adjacent segments disposed between the taps thereof energized in alternate sequence.

16. The means defined by claim 15 further defined by field booster means coupled to the windings of s id solenoid in the central region thereof for compensating resistive power losses therein.

17. Means as defined by claim 15 wherein said programming means comprises a peak current detector coupled to each one of said segments and to the portions of said solenoids interposed between the taps of adjacent segments for responsively actuating the corresponding short circuit switching means, trigger means responsively coupled to said peak current detectors for actuating inwardly successive pairs of said series and parallel switching means, and initiator means coupled to the extreme outward respective pairs of said series and parallel switching means for actuating same in concert.

18. Apparatus for confining plasma and raising same to elevated kinetic temperatures comprising an elongated vacuum ch mber pervious to magnetic fields, means communicating with said chamber for evacuating same to high vacuum, an elongated solenoid disposed concentric with reference to said chamber and having a plurality of solenoidal segments, each of said segments having a tap intermediate the ends thereof, a plurality of charged capacitor banks, a plurality of ignitrons correspondingly connected in series with said capacitor banks, said ignitrons in series with the capacitor banks correspondingly alternately connected between the ends of said segments and between the taps of adjacent ones of said segments, a central charged capacitor bank, a second plurality of ignitrons each connected to a different one of the taps and ends respectively of said segments and commonly connected to corresponding sides of said central capacitor bank symmetrically with reference to the center of said solenoid, a third plurality of ignitrons correspondingly alternately connected between the ends of said segments and between the taps of adjacent ones of said segments, initiator means coupled to the extreme outward respective pairs of said first and second pluralities of ignitrons for firing same in concert, means responsive to the attainment of peak current in each one of said segments and in the portions of said solenoid disposed between the taps of adjacent segments respectively for triggering corresponding ones of said third plurality of ignitrons, a plurality of trigger means correspondingly coupled in firing relationship between said last named means and inwardly successive pairs of the first and second pluralities of ignitrons to thereby establish within said vacuum chamber an axially symmetric time rising magnetic field having proximally moving gradientially-intensified reflector field closures defining a magnetic containment zone, and ion source means communicating with said chamber for injecting electrically charged nuclear fuel particles into said containment zone.

19. Ionized plasma accelerating means comprising a segmented solenoid, a plurality of electrical energy storage means, a plurality of series switching means correspondingly connecting said plurality of storage means in closed series relationship with the segments of said solenoid disposed axially from one end segment, a parallel array of switching means each connected to a different one of the solenoidal segments disposed between the second end segment and the first end of said solenoid, central electrical energy storage means having one side commonly connected to said parallel array of switching means and the other side connected to the second end of said solenoid, a plurality of short circuit switching means correspondingly connected in parallel with the solenoidal segments, a power source connected in charging relationship with said plurality of storage means and said central storage means, initiator means commonly coupled in actuating relationship to the extreme outward ones of the series and parallel switching means corresponding to the first end of said solenoid, means responsive to the attainment of peak current in each one of said segments for correspondingly actuating said short circuit switching means, and a plurality of trigger means responsively coupled between each one of said last named means and corresponding successive pair of series and parallel switching means toward the second end of said solenoid whereby an axially symmetric time rising magnetic field having a gradientially-intensified reflector field closure moving axially from the first to the second end of said solenoid is established therein, said field being effective in accelerating an ionized plasma axially within said solenoid.

20. Ionized plasma accelerating means comprising a segmented solenoid, a plurality of capacitor banks, a central capacitor bank, a power source coupled to said plurality of capacitor banks and said central capacitor bank for charging same to high voltage, a first plurality of ignitrons each having its cathode connected to a different one of the segments of said solenoid preceding the last segment thereof and its anode connected to the positive side of a corresponding one of said plurality of capacitor banks, conductor means correspondingly connected between the negative sides of said capacitor banks and said segments to form closed series circuits therewith, a second plurality of ignitrons each having their cathodes connected to a different one of the segments of said solenoid succeeding the first one thereof and their anodes commonly connected to the positive side of said central capacitor bank, conductor means connected between the negative side of said central capacitor bank and the last one of said segments, a third plurality of ignitrons correspondingly coupled across said segments, the cathodes and anodes of said ignitrons respectively correspondingly connected to the cathodes of said first plurality of ignitrons and the negative sides of the corresponding capacitor banks, a diode having its anode and cathode respectively connected to the anode and igniter of each one of said third plurality ignitrons to render same conducting in response to peak current in each corresponding one of said segments, a plurality of pulse transformers each having their primary winding connected in series with a different one of the diodes corresponding to segments preceding the last two segments of said solenoid, a plurality of trigger circuits responsively coupled between the secondary windings of said transformers and the igniters of each corresponding successive pair of said first and second pluralities of ignitrons, and initiator pulse generating means commonly coupled to the igniters of the first ones of said first and second pluralities of ignitrons to trigger same in concert whereby an ionized plasma introduced to the interior of said solenoid is accelerated axially toward the last segment thereof.

21. Means as defined by claim 20 wherein portions of adjacent segments of said solenoid are electrically common to effect an electrical overlap and thereby increase the mutual inductive coupling therebetween.

References Cited in the file of this patent

Atomic Industry Reporter, News and Analysis, Official Text Section 1958, Library No. TK 9001–A7. Issue of January 29, 1958. Pages 54:5–54:11.

Warfield: "Controlled Thermonuclear Fusion," appearing in R.C.A. Review, vol. 19, No. 2, June 1958, pp. 137–161.

Project Sherwood, The U.S. Program in Controlled Fusion, Bishop, Addision-Wesley Publishing Co., Reading, Mass. September 1958. Pages 51–64, 85, 86, 119–131, 161, 162, 167, and 168.